(12) United States Patent
Sedlar et al.

(10) Patent No.: US 9,569,369 B2
(45) Date of Patent: Feb. 14, 2017

(54) SOFTWARE TRANSLATION LOOKASIDE BUFFER FOR PERSISTENT POINTER MANAGEMENT

(75) Inventors: Eric Sedlar, Portola Valley, CA (US); Aman Naimat, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 946 days.

(21) Appl. No.: 13/283,199

(22) Filed: Oct. 27, 2011

(65) Prior Publication Data
US 2013/0111151 A1 May 2, 2013

(51) Int. Cl.
G06F 12/10 (2016.01)
G06F 12/02 (2006.01)
G06F 9/44 (2006.01)

(52) U.S. Cl.
CPC ....... G06F 12/1027 (2013.01); G06F 12/0292 (2013.01); *G06F 9/4435* (2013.01)

(58) Field of Classification Search
None
See application file for complete search history.

(56) References Cited

U.S. PATENT DOCUMENTS

| | | | | |
|---|---|---|---|---|
| 5,426,747 A * | 6/1995 | Weinreb et al. | | 711/203 |
| 5,895,501 A * | 4/1999 | Smith | | G06F 12/1027 711/128 |
| 7,065,145 B2 * | 6/2006 | Reddy | | 375/261 |
| 2004/0054867 A1 * | 3/2004 | Stravers et al. | | 711/207 |
| 2006/0288151 A1 | 12/2006 | McKenney | | |
| 2007/0162528 A1 * | 7/2007 | Wright | | G06F 12/0253 |
| 2008/0077909 A1 * | 3/2008 | Collins et al. | | 717/104 |
| 2010/0077136 A1 * | 3/2010 | Ware et al. | | 711/103 |

FOREIGN PATENT DOCUMENTS

CN 101236512 A 8/2008

OTHER PUBLICATIONS

"Notification of Transmittal of the International Search Report and the Written Opinion of the International Searching Authority, or the Declaration" received in International application No. PCT/US12/61451 dated Jan. 30, 2013 (14 pages).

(Continued)

*Primary Examiner* — Christian P Chace
*Assistant Examiner* — Eric Loonan
(74) *Attorney, Agent, or Firm* — Hickman Palermo Becker Bingham LLP

(57) ABSTRACT

Techniques are provided for performing OID-to-VMA translations during runtime. Vector registers are used to implement a "software TLB" to perform OID-to-VMA translations. Runtime dereferencing is performed using one or more vector registers to compare each OID that needs to be dereferenced against a set of cached OIDs. When a cached OID matches the OID being dereferenced, the VMA of the cached OID is retrieved from cache. Buffer cache items may be pinned during the period in which the software TLB stores entries for the items. The cache of OID translation information may be single or multi-leveled, and may be partially or completely stored in registers within a processor. When stored in registers, the translation information may be spilled out of the register, and reloaded into the register, as the register is needed for other purposes.

22 Claims, 6 Drawing Sheets

102

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| VMA1 | VMA2 | VMA3 | VMA4 | VMA5 | VMA6 | VMA7 | VMA8 | VMA9 | VMA10 | VMA11 | VMA12 | VMA13 | VMA14 | VMA15 | VMA16 |
| OID1 | OID2 | OID3 | OID4 | OID5 | OID6 | OID7 | OID8 | OID9 | OID10 | OID11 | OID12 | OID13 | OID14 | OID15 | OID16 |

104

| | | | | | | | | | | | | | | | |
|---|---|---|---|---|---|---|---|---|---|---|---|---|---|---|---|
| | | | | | | | | | | | | | | | |

(56) References Cited

OTHER PUBLICATIONS

Current Claims of International application No. PCT/US12/61451 dated Jan. 2013 (4 pages).
Hilewitz, Y. et al., "Fast Bit Gather, Bit Scatter and Bit Permutation Instructions for Commodity Microprocessors" *2008 Springer Science* (26 pages). Jun. 2008.
Ortin, F. et al., "Separating Adaptable Persistence Attributes through Computational Reflection" *2004 IEEE* (10 pages). Nov. 2004.

* cited by examiner

| 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|
| PIN1 | PIN2 | PIN3 | PIN4 | PIN5 | PIN6 | PIN7 | PIN8 | PIN9 | PIN10 | PIN11 | PIN12 | PIN13 | PIN14 | PIN15 | PIN16 |
| VMA1 | VMA2 | VMA3 | VMA4 | VMA5 | VMA6 | VMA7 | VMA8 | VMA9 | VMA10 | VMA11 | VMA12 | VMA13 | VMA14 | VMA15 | VMA16 |
| OID1 | OID2 | OID3 | OID4 | OID5 | OID6 | OID7 | OID8 | OID9 | OID10 | OID11 | OID12 | OID13 | OID14 | OID15 | OID16 |

SOFTWARE TRANSLATION LOOKASIDE BUFFER FOR PERSISTENT POINTER MANAGEMENT

FIELD OF THE INVENTION

The present invention relates to translating

BACKGROUND

Many computer programs model problems as sets of inter-related objects. During execution, such programs perform operations on objects that are stored as data structures in the memory of the computer system. Objects may have numerous attributes, including attributes that represent relationships to other objects. When a first object has an attribute that represents a relationship to a second object, the first object is referred to as the source object and the second object is referred to as the target object.

The information used to represent an attribute that represents a relationship with a target object is referred to as a "reference". A reference to a target object is stored in the data structure that represents the source object. For many applications, the most common operation in processing objects is to locate the target object based on the reference to the target object contained in the source object. This operation is known as reference traversal.

Many programs use a data type called a "pointer" to reference a target object. A pointer indicates the memory location of the data structure that corresponds to the target object. To allow a program to access more objects than can fit in the available dynamic memory, pointers typically contain a virtual memory address (VMA) of the target object rather than the actual physical address of the dynamic memory location at which the target object resides. When a program uses the VMA as the representation of the reference, the program relies on the underlying virtual memory mechanism of the computer operating system and hardware for looking up the physical memory addresses of target objects.

When an object is in dynamic memory, the VMA of the object is generally used to represent a reference to the object because most computers have a built-in hardware lookup mechanism and high-speed memory for an address translation table that maps VMAs to physical memory addresses. In addition, operating systems typically provide efficient memory caching support based on virtual memory access. By employing the built-in address translation and memory caching mechanisms, the use of VMAs as references to target objects results in a highly efficient reference traversal.

Unfortunately, VMAs and physical memory addresses are dynamically allocated, and are thus only valid, within and during a particular program execution. Therefore, a VMA used for a target object during one execution of a program may not be the same for the same target object during a subsequent execution of the same program. Similarly, the VMA of any given target object may not be the same for two concurrently executing programs. Therefore, VMAs cannot be used as the sole representation of references to target objects in environments where objects are shared across different executions of the same program, or across different concurrently-executing programs.

In a database management system (DBMS), the information used for references must correctly identify objects across all program executions. Some unique way of permanently identifying the object must be provided, which shall be referred to herein as an "object identifier" (OID). OIDs must be based on the lowest-level physical storage address. Thus, an OID typically communicates where an object is located on disk, as opposed to the object's VMA or physical memory address. Consequently, OIDs are typically based on some form of data block ID. OIDs may, for example, include a multi-part key that indicates a file number (identifying the file where the information is stored on disk) or a proxy thereof, and a relative block number (which counts the number of fixed-size blocks into that file where the data is stored). (Other usages for OID in the literature sometimes describe a LOGICAL persistent unique ID, but this must eventually be mapped to a physical storage address via an index or similar structure).

Unlike VMAs, the OID of an object uniquely identifies the object across all program executions. However, if the OID is used as a reference to an object stored in dynamic memory, each traversal operation requires mapping the OID to the VMA of the target object, and then mapping the VMA to the physical memory address of the target object. The process of mapping an OID to a VMA consumes significantly more processing time than mapping a VMA to a physical address.

Various attempts have been made to achieve the efficiency of reference traversals with VMAs while still being able to share objects between multiple programs and multiple executions of the same program. One common approach uses OIDs as references to objects that are not currently loaded into dynamic memory, and VMAs as references to objects that have been loaded into dynamic memory. Therefore, references to an object must be converted from one form to another when the object is transferred between static memory and dynamic memory. The process of converting references between an external form and an internal form is referred to as reference swizzling.

According to one reference swizzling technique, when an object is loaded from disk into main memory, all of the references contained within the object are converted into VMAs. Since the target objects of those references may not be in main memory, VMAs must be pre-allocated for the target objects as if they were already in main memory.

When a reference to a target object that is not in main memory is traversed, the DBMS loads the target object into main memory. To detect such reference traversal operations, the DBMS may rely on the computer operating system by setting all pre-allocated VMAs in access-protected mode. When an access-protected VMA is accessed, the computer operating system detects a memory access protection violation and raises an exception. The DBMS handles the exception by loading the desired target object into main memory and changing the VMA to a mode that allows access.

While the use of protected mode allows for fast reference swizzling, it relies on special operating system supports, such as the memory access control, detection, and exception handling functions of the operating system. Unfortunately, these supports may deviate from platform to platform, and may even be unavailable in some platforms. Therefore, this approach is not practical for DBMS systems that are intended for use on multiple platforms. Further, because memory has been pre-allocated for all of the objects, the memory cannot be reused for other purposes. Therefore, applications that use a large number of objects may run out of memory.

According to an alternative approach, each reference is a data structure that contains a discriminant field and a variant field. The value in the discriminant field indicates whether the variant is an object identifier or the VMA of the target object. Each object in main memory has a "surrogate" that is a data structure containing a reference count, the object identifier of the target object, and the VMA of the target object. When the DBMS loads an object from disk into main memory, the value of the discriminant of each reference contained in the object is initially set to indicate that the corresponding variant is the object identifier of the target object.

When an application traverses the reference, the DBMS determines whether the discriminant of the reference indicates that the variant is an object identifier or a VMA. If the variant is a VMA, then the VMA is used to locate the surrogate. The VMA stored in the surrogate is then used to locate the target object.

If the variant is an object identifier, then the DBMS looks up the VMA of the surrogate. If the surrogate exists, then the variant of the reference is set to the VMA of the surrogate. The discriminant of the reference is set to indicate that the variant is the VMA of the surrogate. The reference count of the surrogate is then incremented by one.

If the surrogate does not exist, then the target object is loaded from disk into main memory, a surrogate is allocated for the target object, the object identifier and the VMA in the surrogate are set to those of the target object and the reference count of the surrogate is set to zero. Then, the DBMS performs the steps of setting the variant, setting the discriminant, and incrementing the reference count, as described above.

When an object is saved to disk, the DBMS decrements the reference count of all of the surrogates pointed to by the references in the object. Therefore, at any given time, the reference count of a surrogate indicates how many references are currently pointing to the surrogate. Only when the reference count of a surrogate is zero may the object pointed to by the surrogate be swapped to disk and the surrogate deallocated.

One disadvantage of the surrogate technique is that the DBMS cannot swap an object to disk to free up memory as long as an object that has a traversed reference to the object remains in memory. Consequently, the DBMS may become significantly limited with respect to how it may free up memory to load newly referenced objects. In addition, the process of decrementing surrogates adds overhead to the process of storing objects to disk.

U.S. Pat. No. 5,887,275 describes a technique for swizzling references that attempts to address these disadvantages. According to that technique, if a reference to an object has previously been used to locate a first object, then a data structure referred to as a "tombstone" that has been associated with the first object is located based on a first VMA that is stored in the reference.

Once the tombstone has been located, a first pseudo-timestamp that is stored in the reference is compared to a second pseudo-timestamp that is stored in the tombstone. If the first pseudo-timestamp matches the second pseudo-timestamp, then the first object is located based on a second VMA that is stored in the tombstone.

If the first pseudo-timestamp does not match the second pseudo-timestamp, then the first object is located based on an identifier stored in the reference. Similarly, if the reference has not been previously used to locate the first object, then the first object is located based on the identifier stored in the reference.

Unfortunately, even when such techniques are used to defer or otherwise reduce the overhead associated with converting OIDs to VMAs, such conversion operations often take a significant amount of CPU time, consume extra storage space, and/or add additional latency to separate the pointer data from the real data when swizzling.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 5 is a block diagram illustrating an extended cache that stores pin information, according to an embodiment of the invention.

DETAILED DESCRIPTION

Figure 1:
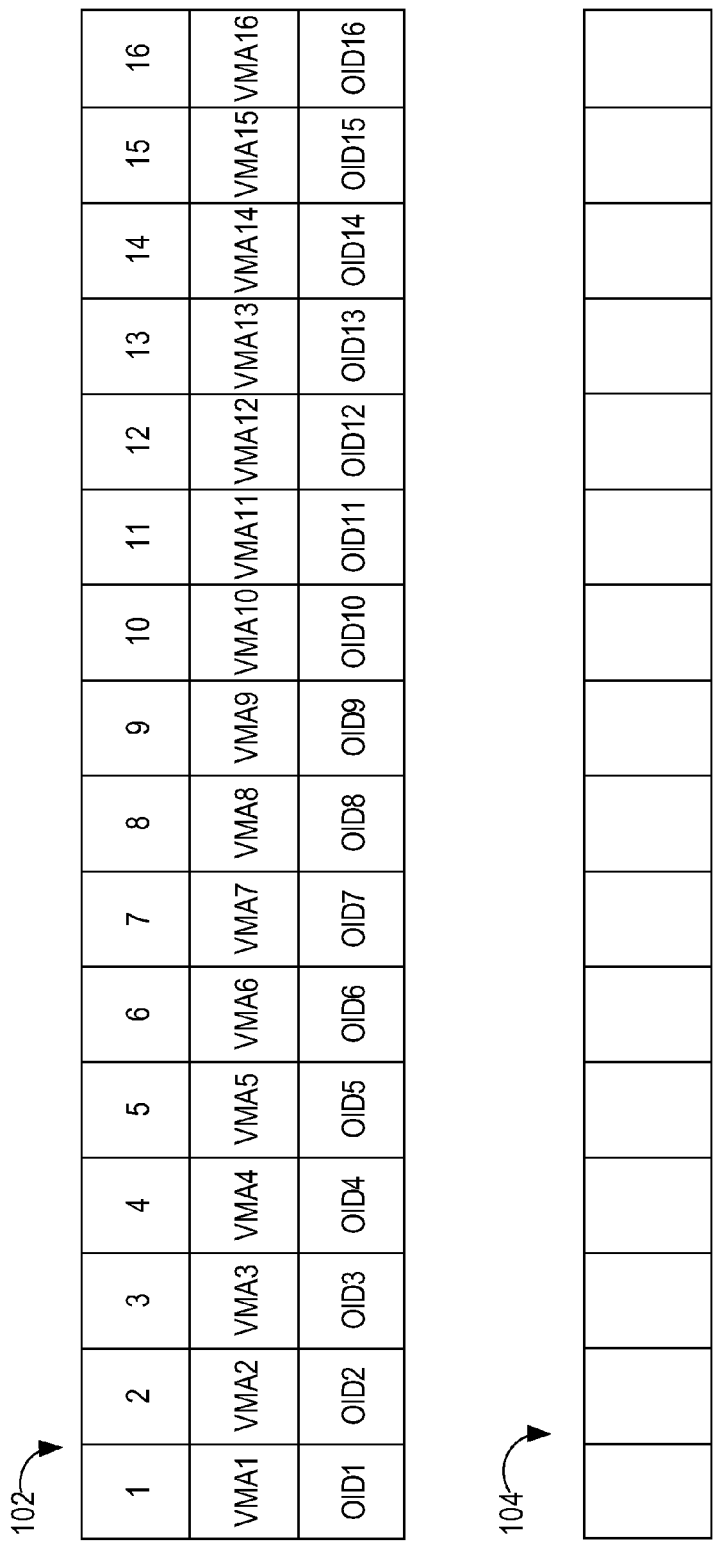
FIG. 1 is a block diagram that illustrates how a vector register may be used as a "software TLB" during OID-TO-VMA translation operations, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for performing OID-to-VMA translations in a manner similar to how VMA-to-physical memory address translations are performed using the Translation Lookaside Buffers (TLBs) commonly implemented in microprocessors (such as the Intel x86 series). However, because the size of OIDs exceeds the capacity of hardware TLBs, techniques are described herein for using vector registers to implement a "software TLB" to perform OID-to-VMA translations.

According to one embodiment, the overhead associated with swizzling is avoided because OIDs are not replaced with VMAs. Instead, OIDs are dereferenced as needed during runtime. Runtime dereferencing is performed using one or more vector registers to compare each OID that needs to be dereferenced against a set of cached OIDs. When a cached OID matches the OID being dereferenced, the VMA of the cached OID is retrieved from cache. The cache of OID translation information may be single or multi-leveled, and may be partially or completely stored in registers within a processor. When stored in registers, the translation information may be spilled out of the register, and reloaded into the register, as the register is needed for other purposes.

VMA to Physical Address Translation

VMA-to-physical memory address translation is typically handled by a layered approach, where the first layer involves using a "Translation Lookaside Buffer" (TLB). A typical TLB uses a fixed number of entries to map virtual addresses to physical addresses. There may be multiple levels of TLB. For example, in one common microarchitecture (Intel Core2 Duo), a first level TLB has 16 entries, and a second level TLB has 256 entries. If an address to be translated is not in any level of the TLB, then an Operating System page table is walked, which involves waiting for multiple memory accesses. Multiple memory accesses can be slow when page tables are large. A TLB is typically implemented in hardware using a technique called "content addressable memory", or CAM.

Unfortunately, it is not practical to use a hardware TLB to perform OID-to-VMA translations, due to the size constraints on TLB hardware. For example, even on a 64-bit processor, TLBs generally do not support using all 64 bits for addresses, since the hardware restricts the amount of physical memory that can be plugged into the system to much less than $2^{64}$ bytes. Consequently, even in a 64-bit system, the TLB may only be designed to handle addresses that are 40 bits. In contrast, OIDs are designed to address much larger storage spaces. For example, one implementation of OIDs uses OIDs that are large enough to address $2^{79}$ bits (604,462,909,807 terabytes).

Vector Registers

Many processors are being built with registers that are able to perform the same operation on multiple bytes, in parallel. Such registers are generally referred to as "vector registers". For example, a processor may include N registers of X bytes each. In a typical implementation, N may be 16, and X may be 16, 32 or 64. Different values may be loaded into each of the N registers within a vector register. During the same clock cycle(s), the processor may perform the same operation, in parallel, on the X bytes in each of the N registers within the vector register.

Some existing processors are able to issue as many as three vector instructions per clock cycle. The vector instruction sets may support, for example, a parallel compare instruction, where all bytes within a register are compared simultaneously with other bytes. As shall be described in greater detail below, such vector registers, and the parallel vector operations that may be performed therewith, may be used to implement a "software TLB" for performing OID-to-VMA translations.

OID-TO-VMA Translation Using a Vector Register

FIG. 1 is a block diagram that illustrates how a vector register 104 may be used as a "software TLB" during OID-TO-VMA translation operations, according to an embodiment of the invention. For the purpose of explanation, it shall be assumed that OIDs are 64 bit addresses (and therefore too large to fit into a conventional hardware TLB). It shall also be assumed that vector register 104 is 16 bytes wide, and that the processor that includes vector register 104 is capable of issuing three compare instructions per clock cycle. Under these circumstances, vector register 104 can be used to perform 96 bytes of comparison per cycle, which would allow comparison operations to be performed on six 64-bit OIDs per cycle.

While examples shall be provided herein of specific OID and vector register sizes, the techniques described herein are not limited to any particular OID size or format, nor any particular number or size of registers within a vector register. The greater the number of registers in a vector register, and the larger the size of the individual registers, the greater the number of OIDs that can be compared in parallel during any given clock cycle.

Referring again to FIG. 1, it also illustrates a cache 102 with 16 OID/VMA pairs. Each OID/VMA pair includes an OID and a VMA, each of which correspond to the same object. Specifically, the VMA of an OID/VMA pair indicates the location of an instance of the object in virtual memory, while the OID of the OID/VMA pair indicates the persistent storage location of the same object. In addition, the VMA and OID of each OID/VMA pair reside at the same index location within cache 102. For example, VMA1 and OID1 correspond to the same object, and both reside at index position 1 within cache 102.

During an OID-TO-VMA translation operation, OID values from cache 102 are loaded into the vector register 104, and compared against the OID that is being dereferenced (the "target" OID). For example, assume that the target OID is OIDX. To determine the VMA of the object that is persistently located at OIDX, OIDs from cache 102 are loaded into vector register 104 can compared against OIDX.

Because OIDs are larger than a byte, each of the 16 OIDs within cache 102 cannot simply be loaded into one of the 16 bytes within vector register 104. Instead, in one embodiment, as many of the OIDs from cache 102 as will fit into vector register 104 are loaded into vector register 104. In the present example, OIDs are 64 bits and vector register 104 is 16 bytes, so two OIDs fit into vector register 104 at any given time.

Figure 2:
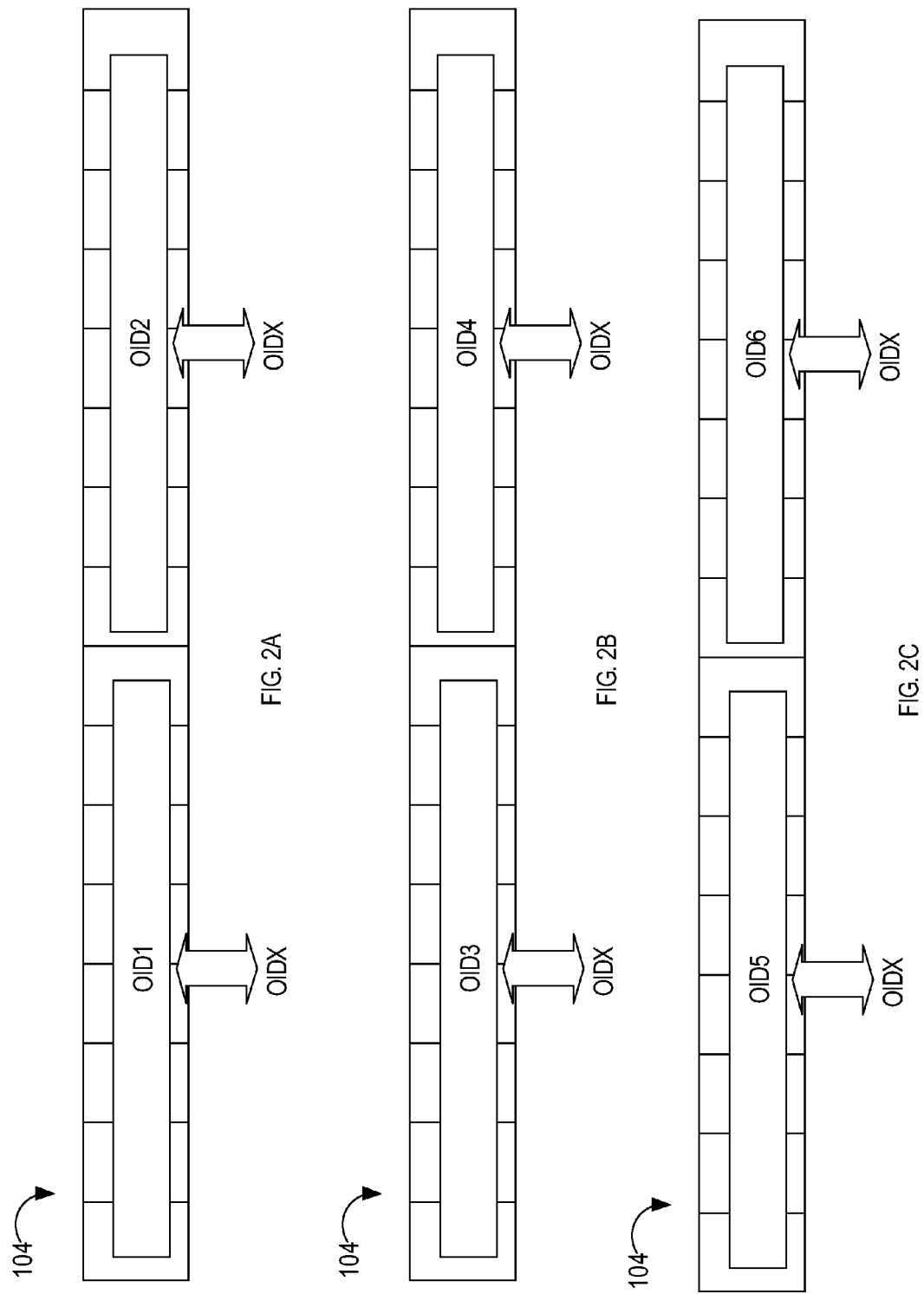
FIGS. 2A-2C illustrate the comparisons made using a vector register during the first clock cycle, according to an embodiment of the invention.
Figure 3:
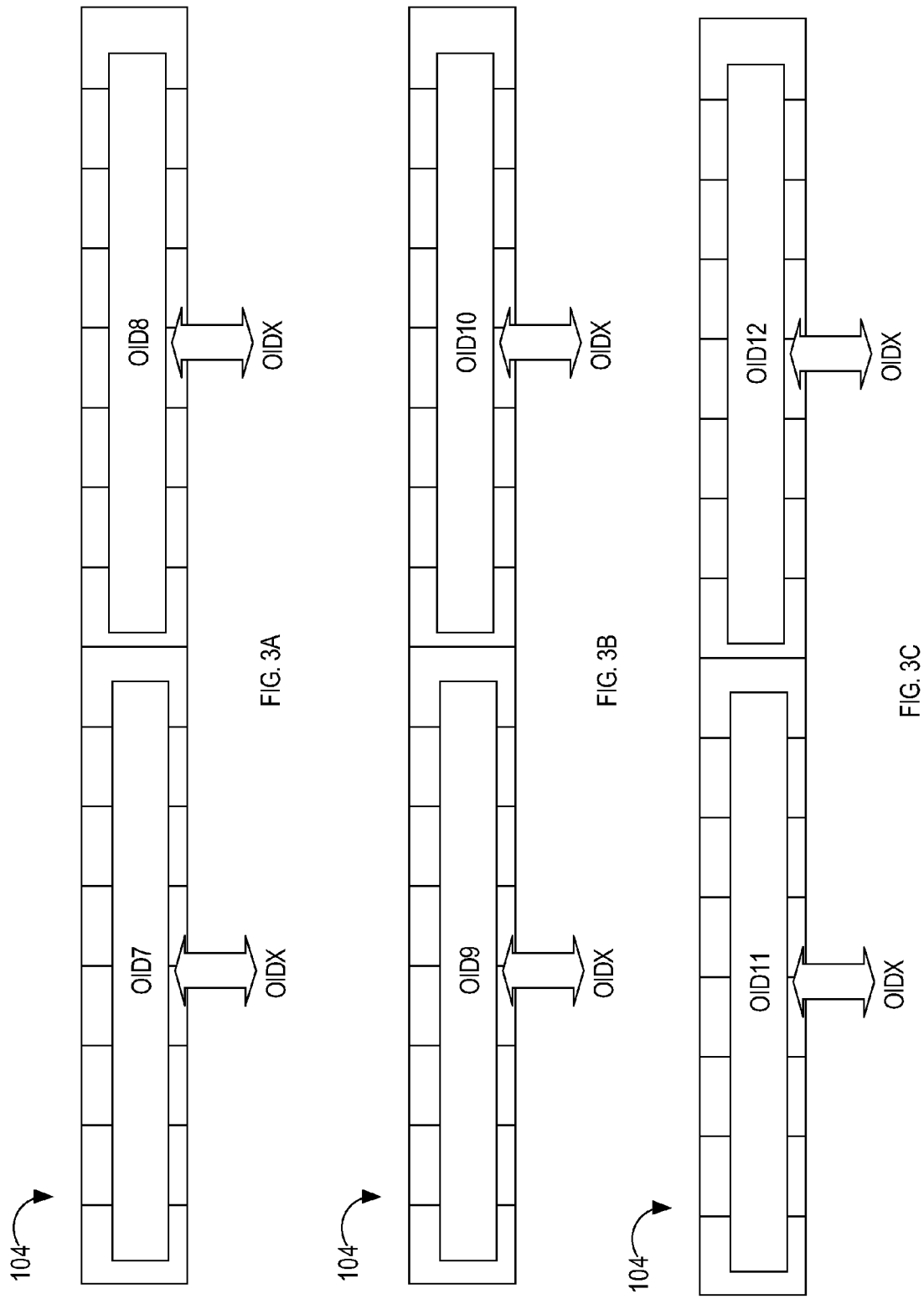
FIGS. 3A-3C illustrate the comparisons made using a vector register during the first clock cycle, according to an embodiment of the invention.
Figure 4:
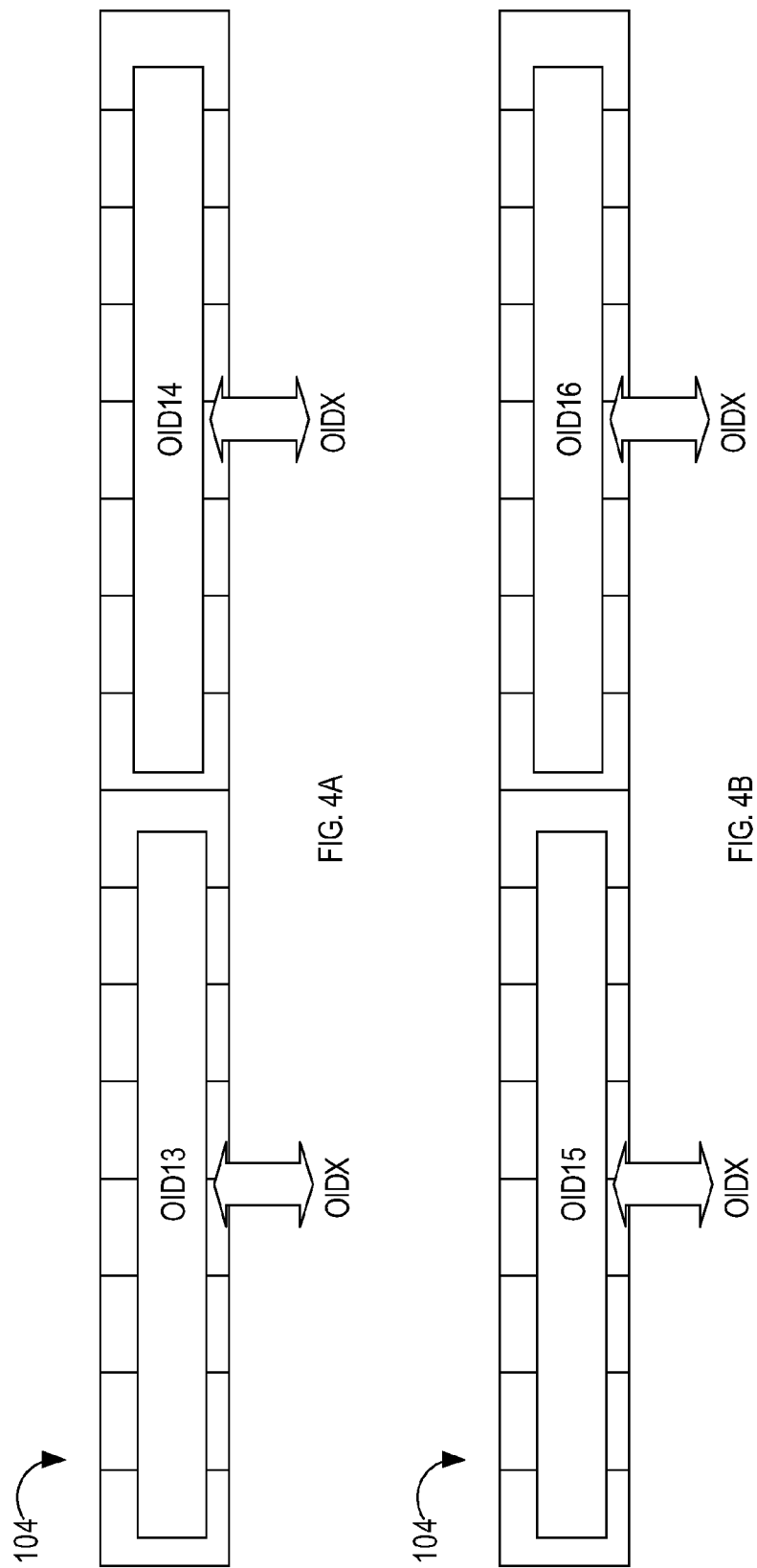
FIGS. 4A-4B illustrate the comparisons made using a vector register during the first clock cycle, according to an embodiment of the invention.

Because two OIDs fit into vector register 104 at a time, and the processor to which vector register 104 belongs is capable of executing three comparisons per clock cycle, six OIDs from cache 102 can be compared against the target OID during each clock cycle. For example, FIGS. 2A-2C illustrate the comparisons made during the first clock cycle. Specifically, FIG. 2A illustrates that during the first clock cycle, OID1 and OID2 are compared against OIDX. FIG. 2B illustrates that, still during the first clock cycle, OID3 and OID4 are compared against OIDX. Finally, FIG. 2C illustrates that, still during the first clock cycle, OID5 and OID6 are compared against OIDX. Similarly, FIGS. 3A-3C illustrate that OID7-OID12 are compared against OIDX during the second clock cycle. FIGS. 4A-4B illustrate that OID13-OID16 are compared against OIDX during the third clock cycle.

If any of the OIDs in cache 102 matches OIDX, then the index of the matching OID is used to locate, within cache 102, the VMA of the object that corresponds to the matching OID. For example, if OID3 matches OIDX, then the index value 3 is used to locate VMA3 within cache 102. VMA3 is then used to locate the corresponding object within volatile memory.

The techniques described herein are not limited to any particular way of using a virtual memory address to locate an object within volatile memory. For example, a conventional hardware TLB may be used to translate a VMA (obtained from the software TLB) to a physical address, which may then be used by a processor to access the object in physical memory.

Deriving the Index Value

In the embodiment illustrated in FIG. 1, when an OID from cache 102 matches the target OID, the index value of the matching OID is used to locate, within cache 102, the corresponding VMA. However, depending on how vector register 104 is implemented, the OID-to-OID comparisons performed using the vector register 104 do not directly produce the index value of the matching OID.

For example, in one implementation of vector register 104, an OID-to-OID comparison produces a hex value 0xFF in each byte where the OIDs match, and a hex value 0x00 in each byte where the OIDs do not match. Thus, the comparison operation with an OID that matches the target OID will produce 8 bytes of 0xFF.

Various additional instructions may be used to derive the matching index value from the results of the comparison operations. For example, in one processor implementation (Intel SSE), instructions (PACKSSDW, PACKSSWB) are provided for packing bytes, and an instruction (PMOVM-SKB) is provided for converting bytes that contain the value 0xFF into a set bit in a general purpose register. Using these instructions, the 8 bytes produced by each OID-to-OID comparison may be compressed to 4 bytes, then from 4 bytes to 2 bytes, and then from 2 bytes to one byte. Once each comparison is represented by a single byte, the value of those bytes can be converted into bits in a general purpose register. Converting the bytes of the results produced by the comparisons of the 16 cached OIDs would produce a string of 16 bits within the general purpose register, where the bit for a matching OID would be 1 and the bit for all other OIDs would be 0.

To obtain the index value from the bit array, the bit array is scanned until the first set bit is encountered. The position of the first set bit within the bit array is the index value used to look up the corresponding VMA within cache 102. For example, if OID3 matches OIDX, then the bit array produced by the comparison and compression operations would be "0010000000000000". By scanning the bit array, it can be determined that the first set bit is at position 3, so 3 is used as an index into cache 102 to locate VMA3.

In an embodiment that uses the foregoing technique for deriving an index value, the OID-to-VMA mapping operation may be carried out as follows:

Use vector registers to perform comparisons between OIDs in the cache and the target OID
  Pack 8 byte results into 4 byte results
  Pack 4 byte results into 2 byte results
  Pack 2 byte results into 1 byte results
  Convert the set bytes into corresponding bits in a single general-purpose register
  Scan the general-purpose register to find the first set bit
  Use the position of the first set bit as an index into the cache to find the VMA Using conventional hardware, each of these steps other than the initial OID-to-OID comparisons can be performed in a single clock cycle. Thus, the entire OID-to-VMA translation may take 7-10 clock cycles, which is significantly lower relative to the overhead associated with actually accessing the referenced data, which is likely to be in a slower cache or main memory.

Cache Misses and Replacement Techniques

In the example illustrated in FIG. 1, a single level of caching is used to implement a software TLB for performing OID-to-VMA conversions. However, the software TLB may be implemented with multiple levels of cache, where OIDs in a second level of cache are compared against the target OID if no OIDs in the first level cache match the target OID. Typically, the second and subsequent levels of cache are larger, but less efficiently accessed, than the first level cache 102. For example, cache 102 may reside in a relatively small, high-speed memory on board a processor, and a second level cache may reside in a slower cache on or off the processor, or in main memory.

If the target OID does not match any OID in the software TLB, then the VMA associated with the target OID is determined by other means, such as an index search. Upon determining the VMA of an object whose OID does not reside in cache 102, the OID/VMA combination for that object may be added to cache 102 to improve the efficiency of subsequent dereferencing operations involving that object. If cache 102 is fully populated, then an OID/VMA combination that currently resides in cache 102 may be replaced with the new OID/VMA combination.

Any one of a variety of replacement techniques may be used to determine which OID/VMA combination within cache 102 to replace with a new OID/VMA combination. For example, the OID/VMA combination that has resided within cache 102 the longest may be replaced by the new OID/VMA combination. This may be accomplished by replacing entries within cache 102 in a round robin fashion. Alternatively, access to the OID/VMA combinations may be tracked, and the least frequently accessed, or least recently accessed, OID/VMA combination may be selected for replacement. In alternative embodiments, the replacement technique takes into account a variety of factors, including the frequency of access, recency of access, and age within cache 102.

Caching Pin Information

The software TLB techniques described herein may be used in any context in which addresses to items in persistent memory need to be converted to addresses of instantiations of those items within volatile memory. One context in which a software TLB may be used is a database environment, where the OIDs are to items stored persistently within a database. In such a context, additional benefits may be derived by caching, within cache 102, information in addition to the OID/VMA combinations.

For example, FIG. 5 is a block diagram that illustrates and extended cache 502, according to an embodiment of the invention. Extended cache 502 contains, in addition to OID/VMA combinations, PIN values that are used by a database system to manage access to the corresponding objects.

Databases typically maintain a memory cache of persistent data. The memory cache, which is often referred to as a "buffer cache", keeps a copy of blocks from a persistent storage medium (e.g. a disk drive) in the DRAM, which is much faster to access than persistent storage. A "pin" is a data structure used by some database servers to ensure that a block in the buffer cache is not paged out of the buffer cache while the block is still in use.

According to the embodiment illustrated in FIG. 5, when a target OID is initially dereferenced, (a) an entry for the OID/VMA combination is added to cache 502, and (b) the page that corresponds to the target OID is pinned within the buffer cache. Further, the entry that is added to cache 502 includes not only the OID/VMA combination, but also a corresponding pin.

For example, assume that cache 502 does not initially contain an entry for OID3. In response to dereferencing OID3, the page that corresponds to OID3 is pinned in the buffer cache, and the entry containing OID3, VMA3 and PIN3, is added to cache 502.

According to one embodiment, the pin is passed to the process that caused the dereferencing operation to be performed. When that process is done using the object to which the dereferenced OID points, the process passes the pin to a "release" function to indicate that the process in no longer using that object. As long as any process holds a pin on an object in the buffer cache, the object is not considered a candidate for replacement. When all processes have released pins on an object, the object becomes a candidate for replacement within the buffer cache.

According to another embodiment, a pin is maintained on each read-only snapshot page in a buffer cache for as long as the OID/VMA combination for the read-only snapshot page is in cache 502. In response to the OID/VMA combination being replaced, within cache 502, with an entry for a more recently used OID/VMA combination, the pin to the corresponding read-only snapshot page is released.

Register Spilling

During compilation of a program, various situations may cause a compiler to generate code for spilling the contents of registers to other memory, such as the processor stack. For example, C compilers typically allocate space for local variables of functions on the processor stack, and the stack is typically stored in the main memory of the processor. The C compiler optimizes accesses to these variables by storing a second copy of their value in a register. Unfortunately, the number of variables used by a function may exceed the number of registers that are available to cache copies of those variables. For example, assume that a function has four local variables, and a processor only has register space for concurrently storing copies of two of the four variables. In this situation, the compiler may initially store copies of the first two variables that are used by the function in the registers. When either of the other two variables needs to be used, the compiler may generate code to cause a "register spill" of one of the first two variables.

Specifically, when all registers are being used, and the compiler needs a new register for use by a particular variable, an existing register storing data on behalf of another variable is reused via a register spill, during which the register's data (which may have been updated) is written back to the stack with the reference value for the variable. A spill-policy implemented by the compiler typically determines which of the variables that are currently stored in the registers should be spilled to make room for a new variable.

Generally, compilers are designed with spill-policies that attempt to keep the most useful information in the registers. However, the information that is most useful depends on the portion of a program for which the compiler is generating code. For example, if a particular variable is accessed within a loop in a program, then when compiling the code for that loop the compiler may generate code that prevents that particular variable from being spilled from the register. However, outside of the code for executing that loop, that same variable may be unneeded. Consequently, after compiling the code for the loop, the compiler may generate code for spilling that variable onto the program stack to make room for other variables.

As shall be described in greater detail hereafter, VMAs produced by OID-to-VMA translations may be stored in registers in the same manner as local variables, to avoid the need to perform OID-to-VMA translations every time a particular object is referenced. In embodiments that store VMAs in registers, the register spilling process of a compiler can be reused to intelligently spill from registers, and reload into the registers, VMAs produced by the STLB translations.

Storing Virtual Memory Addresses in Registers

In one embodiment, once an OID-to-VMA translation operation is performed using vector register 104, the resulting VMA is stored in a general purpose register within the processor. After storing the VMA in a register, subsequent accesses to the corresponding object may directly use the VMA in the register, rather than using the software TLB to perform the OID-to-VMA translation each time. In such an embodiment, dereferencing is performed in phases, where the first phase involves determining whether the VMA is already in a register. If the VMA is not in a register, the second phase is performed, during which it is determined whether the VMA has been spilled out of a register, but is still available. If the VMA has been spilled out of a register, the VMA may be reloaded and used.

If the VMA in neither in a register nor available to be reloaded into a register, then the software TLB is used to determine whether an OID/VMA entry for the target OID is cached. If no OID/VMA entry for the target OID is cached, then other less-performant means are used to determine the VMA for the target OID.

As mentioned above, situations may arise where the registers that are being used to store VMAs are needed for other uses, such as storing variables of a called function. To make room for the called function's variables, the compiler may be configured to spill the VMAs that are in the register prior to a function call that may overwrite the register, in the same manner that the compiler spills variables from registers to make room for other variables. The VMAs may then be reloaded into the register upon returning from that function.

In the event that a reference is made to an object whose VMA is already stored in a register, the VMA may be used directly without incurring the overhead of using the software TLB to perform the OID-to-VMA translation. For example, after vector register 104 has been used to determine that OID3 maps to VMA3, VMA3 may be stored in a register. As long as VMA3 remains in the register, VMA3 may be obtained directly from the register to process subsequent references to OID3. Obtaining VMA3 directly from the register is much faster than using the software TLB to translate OID3 to VMA3. However, there is insufficient register space to store all OID-to-VMA translations. Consequently, within the register, VMAs of less recently or frequently accessed OIDs are spilled to make room for VMAs of more recently or frequently accessed OIDs.

Processor Support

While the techniques described herein may be employed using convention processors that provide vector registers, processors may be modified to further increase the efficiency of OID-to-VMA conversions using a software TLB. For example, processors may be designed with support for performing the OID-to-VMA conversion operations in fewer clock cycles than are presently required by conventional processors. In one embodiment, a processor may be designed with an instruction set that includes an instruction specifically for performing OID-to-VMA conversions. Depending on the hardware used to implement the instruction, the OID-to-VMA operation may be reduced to a single clock cycle. In addition, processors may be designed with vector registers dedicated to and/or specifically designed for performing the operations required by OID-to-VMA conversion operations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
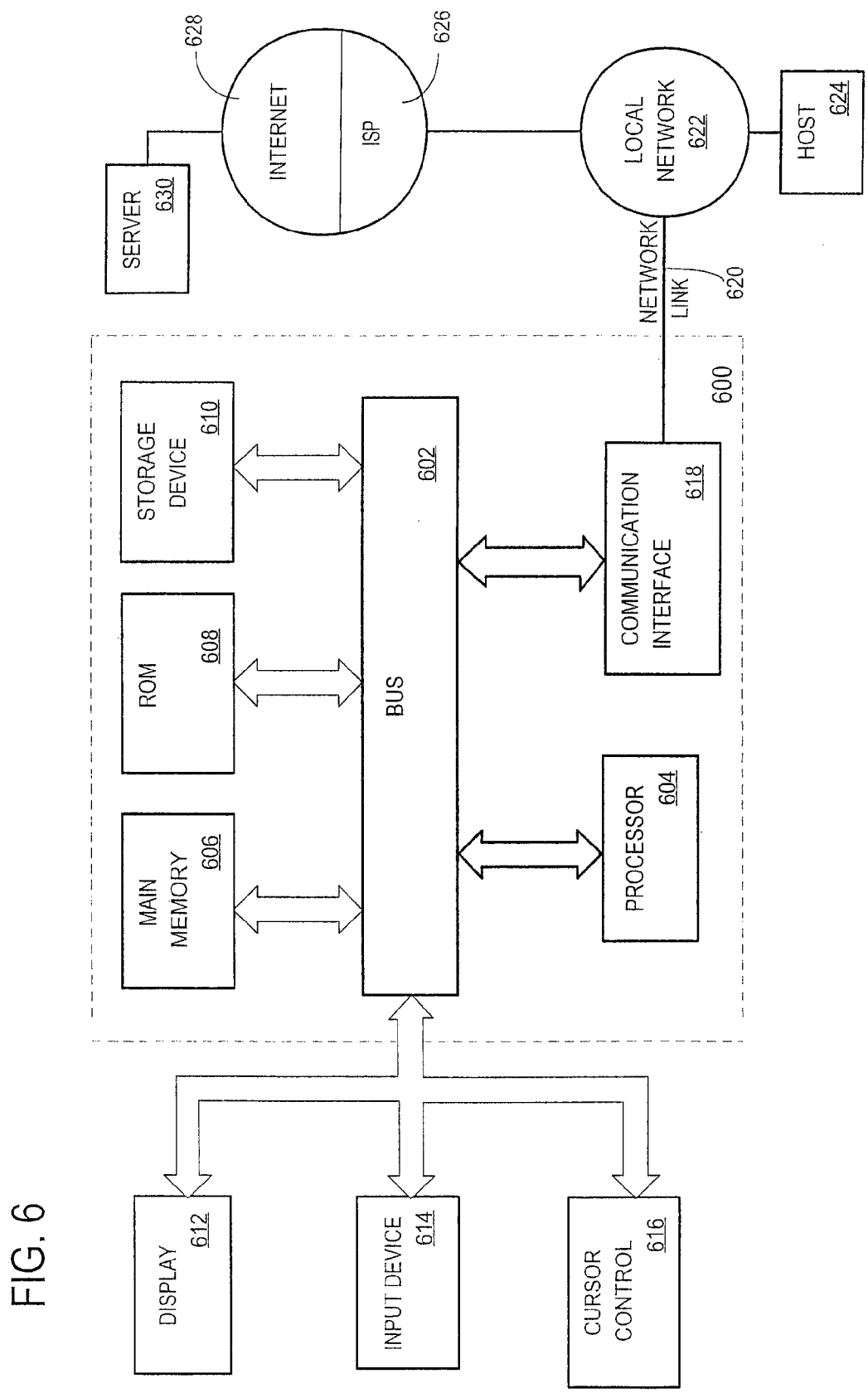
FIG. 6 is a block diagram illustrating a computer system upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A multiple-phase method for dereferencing a target persistent location identifier, the method comprising:
   maintaining a cache of translation information;
   wherein the translation information associates each of a plurality of cached persistent location identifiers with one of a plurality of virtual memory addresses;
   wherein each of the plurality of cached persistent location identifiers indicates where, within persistent storage, a corresponding item is stored;
   wherein each of the plurality of virtual memory addresses indicates where, within virtual memory, an instantiation of the corresponding item is stored;
   during a first phase, determining a virtual memory address based on the target persistent location identifier by:
      using a vector register to perform a plurality of comparisons in parallel;
      wherein each comparison of the plurality of comparisons compares the target persistent location identifier to one of the plurality of cached persistent location identifiers;
      in response to one of the plurality of comparisons resulting in a match between the target persistent location identifier and a particular persistent location identifier of the plurality of cached persistent location identifiers, obtaining the virtual memory address that is associated with the particular persistent location identifier;
   during a second phase, using the virtual memory address that is associated with the particular persistent location identifier to access an instantiation of the item associated with the target persistent location identifier, wherein using the virtual memory address to access the instantiation of the item comprises:
      using a Translation Lookaside Buffer (TLB) to translate the virtual memory address to a physical address that refers to the instantiation of the item associated with the target persistent location identifier, and
      accessing the instantiation of the item at a location, in physical memory, indicated by the physical address;
   wherein the method is performed by one or more computing devices.

2. The method of claim 1 wherein:
   the vector register includes a plurality of fixed-sized registers; and
   two or more of the plurality of fixed-sized registers are used to store each persistent location identifier when said each persistent location identifier is compared to the target persistent location identifier.

3. The method of claim 1 further comprising compressing results of the plurality of comparisons until the result of each comparison operation is represented by a single bit in an array of bits.

4. The method of claim 3 further comprising:
   scanning the array of bits to determine a position of a particular bit, within the array of bits, that indicates the match between the target persistent location identifier and the particular persistent location identifier; and
   wherein obtaining the virtual memory address that is associated with the particular persistent location identifier comprises using the position of the particular bit as an index, into an array that contains the plurality of virtual memory addresses, to locate the virtual memory address that is associated with the particular persistent location identifier.

5. The method of claim 1 wherein:
   the vector register is not large enough to concurrently store all of the plurality of cached persistent location identifiers;
   the plurality of comparisons compare the target persistent location identifier to a first subset of the plurality of cached persistent location identifiers; and
   the method further comprises using the vector register to perform a second plurality of comparisons in parallel, wherein the second plurality of comparisons compare the target persistent location identifier to a second subset of the plurality of cached persistent location identifiers.

6. The method of claim 1 wherein:
   maintaining the cache of translation information includes storing, at one or more locations that correspond to a particular index value:
   a) a particular cached persistent location identifier, of the plurality of cached persistent location identifiers, and
   b) the virtual memory address that is associated with the particular cached persistent location identifier.

7. The method of claim 6 wherein:
   entries for the plurality of cached persistent location identifiers are stored in a first cache;
   the method further comprises pinning, in a second cache, an instantiation of an item that corresponds to a given persistent location identifier for as long as an entry for the given persistent location identifier is in the first cache.

8. The method of claim 1 wherein:
   the target persistent location identifier is for a particular item;
   dereferencing the target persistent location identifier was requested by a particular process;
   a pin to the particular item is stored in a cache entry that corresponds to the target persistent location identifier; and
   the particular process passes the pin to a release function to indicate that the particular process is no longer using the particular item.

9. The method of claim 1 wherein:
   the particular persistent location identifier is for a particular page;
   maintaining the cache of translation information includes storing, in a cache, entries that associate the plurality of cached persistent location identifiers with the plurality of virtual memory addresses;
   the method further comprises:
      maintaining a pin on a read-only snapshot of the particular page as long as an entry for the particular persistent location identifier is in the cache; and
      in response to the entry for particular persistent location identifier being replaced in the cache, unpinning the read-only snapshot of the particular page.

10. The method of claim 1 further comprising:
prior to using the vector register to perform the plurality of comparisons, determining that a translation of the target persistent location identifier is not in a register; and
wherein the step of using the vector register to perform the plurality of comparisons is performed in response to determining that the target persistent location identifier is not in the register.

11. The method of claim 1 wherein maintaining the cache of translation information includes storing particular translation information for one or more persistent location identifiers in a register, and configuring a compiler to:
spill the particular translation information into a second cache in response to use of the register for another purpose; and
after the register has been used for the other purpose, reloading the particular translation information into the register.

12. One or more non-transitory computer-readable media storing one or more sequences of instructions which, when executed by one or more computing devices, cause performance of dereferencing a target persistent location identifier, comprising:
maintaining a cache of translation information;
wherein the translation information associates each of a plurality of cached persistent location identifiers with one of a plurality of virtual memory addresses;
wherein each of the plurality of cached persistent location identifiers indicates where, within persistent storage, a corresponding item is stored;
wherein each of the plurality of virtual memory addresses indicates where, within virtual memory, an instantiation of the corresponding item is stored;
during a first phase, determining a virtual memory address based on the target persistent location identifier by:
using a vector register to perform a plurality of comparisons in parallel;
wherein each comparison of the plurality of comparisons compares the target persistent location identifier to one of the plurality of cached persistent location identifiers;
in response to one of the plurality of comparisons resulting in a match between the target persistent location identifier and a particular persistent location identifier of the plurality of cached persistent location identifiers, obtaining the virtual memory address that is associated with the particular persistent location identifier;
during a second phase, using the virtual memory address that is associated with the particular persistent location identifier to access an instantiation of the item associated with the target persistent location identifier, wherein using the virtual memory address to access the instantiation of the item comprises:
using a Translation Lookaside Buffer (TLB) to translate the virtual memory address to a physical address that refers to the instantiation of the item associated with the target persistent location identifier, and
accessing the instantiation of the item at a location, in physical memory, indicated by the physical address.

13. The one or more non-transitory computer-readable media of claim 12 wherein:
the vector register includes a plurality of fixed-sized registers; and
two or more of the plurality of fixed-sized registers are used to store each persistent location identifier when said each persistent location identifier is compared to the target persistent location identifier.

14. The one or more non-transitory computer-readable media of claim 12 wherein the one or more sequences of instructions further comprise instructions which, when executed by one or more processors, cause compressing results of the plurality of comparisons until the result of each comparison operation is represented by a single bit in an array of bits.

15. The one or more non-transitory computer-readable media of claim 14, wherein the one or more sequences of instructions further comprise instructions which, when executed by one or more processors, cause:
scanning the array of bits to determine a position of a particular bit, within the array of bits, that indicates the match between the target persistent location identifier and the particular persistent location identifier; and
wherein obtaining the virtual memory address that is associated with the particular persistent location identifier comprises using the position of the particular bit as an index, into an array that contains the plurality of virtual memory addresses, to locate the virtual memory address that is associated with the particular persistent location identifier.

16. The one or more non-transitory computer-readable media of claim 12 wherein:
the vector register is not large enough to concurrently store all of the plurality of cached persistent location identifiers;
the plurality of comparisons compare the target persistent location identifier to a first subset of the plurality of cached persistent location identifiers; and
the one or more sequences of instructions further comprise instructions which, when executed by one or more processors, cause using the vector register to perform a second plurality of comparisons in parallel, wherein the second plurality of comparisons compare the target persistent location identifier to a second subset of the plurality of cached persistent location identifiers.

17. The one or more non-transitory computer-readable media of claim 12 wherein:
maintaining the cache of translation information includes storing, at one or more locations that correspond to a particular index value:
a) a particular cached persistent location identifier, of the plurality of cached persistent location identifiers, and
b) the virtual memory address that is associated with the particular cached persistent location identifier.

18. The one or more non-transitory computer-readable media of claim 17 wherein:
entries for the plurality of cached persistent location identifiers are stored in a first cache;
the one or more sequences of instructions further comprise instructions which, when executed by one or more processors, cause pinning, in a second cache, an instantiation of an item that corresponds to a given persistent location identifier for as long as an entry for the given persistent location identifier is in the first cache.

19. The one or more non-transitory computer-readable media of claim 12 wherein:
the target persistent location identifier is for a particular item;
dereferencing the target persistent location identifier was requested by a particular process;

a pin to the particular item is stored in a cache entry that corresponds to the target persistent location identifier; and the particular process passes the pin to a release function to indicate that the particular process is no longer using the particular item.

20. The one or more non-transitory computer-readable media of claim 12 wherein:

the particular persistent location identifier is for a particular page;

maintaining the cache of translation information includes storing, in a cache, entries that associate the plurality of cached persistent location identifiers with the plurality of virtual memory addresses;

the one or more sequences of instructions further comprise instructions which, when executed by one or more processors, cause:

maintaining a pin on a read-only snapshot of the particular page as long as an entry for the particular persistent location identifier is in the cache; and in response to the entry for particular persistent location identifier being replaced in the cache, unpinning the read-only snapshot of the particular page.

21. The one or more non-transitory computer-readable media of claim 12, wherein the one or more sequences of instructions further comprise instructions which, when executed by one or more processors, cause:

prior to using the vector register to perform the plurality of comparisons, determining that a translation of the target persistent location identifier is not in a register; and wherein the step of using the vector register to perform the plurality of comparisons is performed in response to determining that the target persistent location identifier is not in the register.

22. The one or more non-transitory computer-readable media of claim 12 wherein maintaining the cache of translation information includes storing particular translation information for one or more persistent location identifiers in a register, and configuring a compiler to:

spill the particular translation information into a second cache in response to use of the register for another purpose; and after the register has been used for the other purpose, reloading the particular translation information into the register.

* * * * *